Nov. 24, 1931.  W. THALER  1,833,058
BEATING ENGINE FOR PAPER PULP AND THE LIKE
Filed Feb. 7, 1930
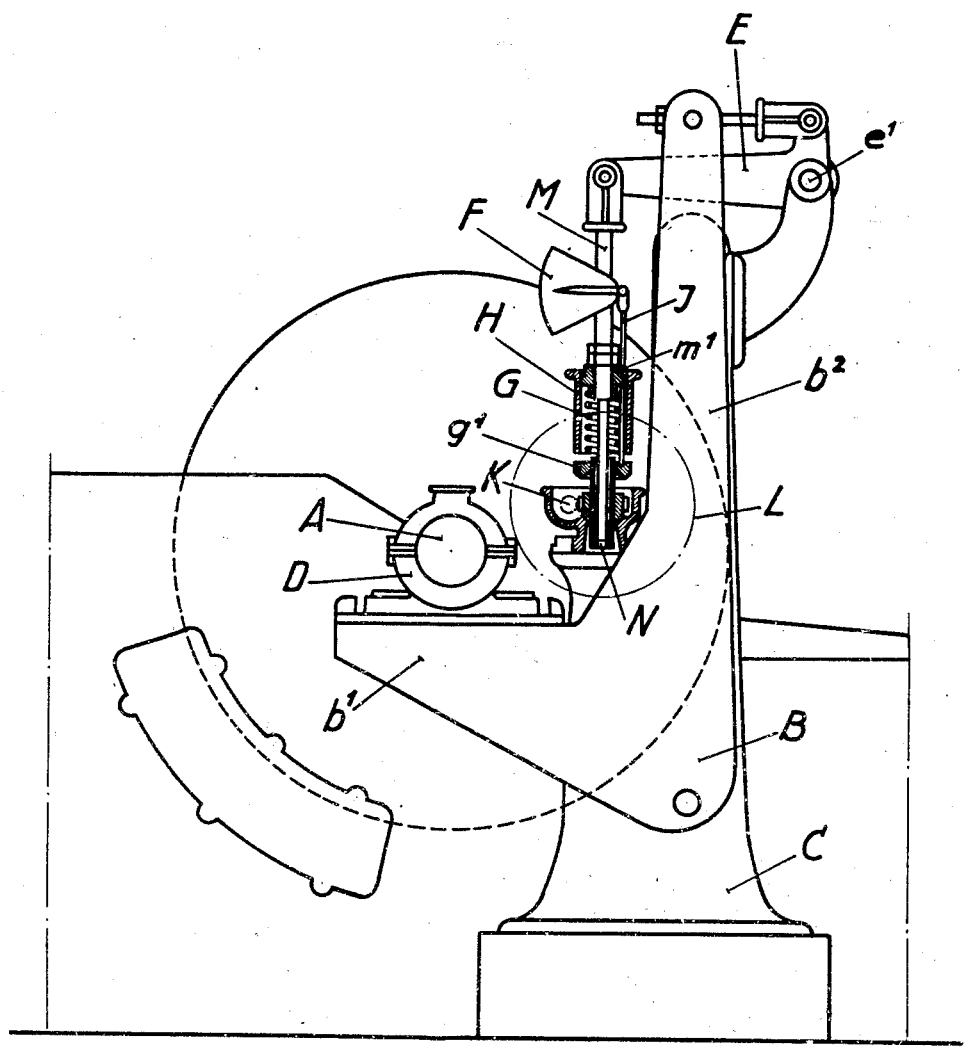
Wilhelm Thaler
by C. P. Goepel
his Attorney.

Patented Nov. 24, 1931

1,833,058

UNITED STATES PATENT OFFICE

WILHELM THALER, OF HEIDENHEIM ON THE BRENZ, GERMANY, ASSIGNOR TO AMERICAN VOITH CONTACT CO., INC., OF NEW YORK, N. Y., A CORPORATION OF NEW YORK

BEATING ENGINE FOR PAPER PULP AND THE LIKE

Application filed February 7, 1930, Serial No. 426,493, and in Germany February 16, 1929.

This invention relates to improvements in beating engines for paper pulp and the like and more particularly has for its object an accurate adjustment and measuring of the beating pressure.

It is of utmost importance for a methodical operation of half stuff and beater stuff plants to continuously check the beating action so that all beating discharges show a uniform degree of beating and freeness of the stuff required for the production of a certain kind of paper. A constant operative control of the beater will be possible only by repeated freeness tests or by constant measurement of the beating pressure.

The adjustment and measurement of the beating pressure as per this invention is effected by a balancing device under the influence of the weight of the beater roll, and their balance beams consist of one two-armed lever each, on one arm of which there is one bearing of the beater roll, whereas on the other arm an adjustable balancing spring is acting in the sense of relieving the roll weight. Said spring is provided with an indicating device. For completely raising the beater roll from the bedplate, the springs, being adjusted for a determined beating pressure, are fixed in such a manner that the removing of the beater roll from the bedplate can be done by the same device, that serves to adjust the beating pressure.

A diagrammatic sketch of such device is shown in the accompanying drawing.

The beater roll A is carried in two bearings D which are fixed on each side on arm $b^1$ of the balancing beams B. The latter are pivoted each on one of the single stands C placed next to center of roll. The other arm $b^2$ of the balancing beams B is connected with spring G by means of rods E pivoted to connecting shaft $e^1$ which runs across the beater. The rod E in turn has pivoted thereto rod M to which is attached a hollow stem N.

A spring G surrounds the rod N and is held in position by an upper plate $m'$ and a lower spring plate $g'$. A sleeve H containing a handle ring at its upper part is screwed onto the outer edge of upper spring plate $m'$. The hollow stem N is in engagement with a worm drive K whose movement is controlled by a hand wheel L. The worm drive K is enclosed. It rests on the stand C. Attached to the rod M is an arcuate scale F on which the pointer of a tie rod J extending through the top plate $m'$ down and onto the bottom plate $g'$ moves so as to show at what beating pressure the beater roll A is operating. It is to be noted that there is a gap between the bottom of the sleeve H and the spring plate $g'$ to allow for the adjustment of the spring G. The pointer of the tie rod J will accordingly indicate on scale F the pressure at which roll A is to operate.

If the sleeve H is rotated downwardly against plate $g'$, the rods M and E and balancing beam B are moved so as to adjust the bearing pressure of the roll A. The pointer of the tie rod J will in turn show on the scale F the working pressure at which the roll A beats the paper to a pulp.

One advantage of this mechanism is that by turning the hand wheel L, the worm-drive K moves rod M whereby beater roll A can be lifted without causing any change in the pressure set by the increase of tension on spring G around rod M. Since the tension on the spring G has been once adjusted it is not necessary to reset the beater roll A to attain the full work necessary to properly beat the paper pulp at the desired pressure indicated by the pointer or rod J on scale F. In accordance with this invention, a saving of time is effected by the use of the worm-drive K to lift the roll A every time a batch of pulp has been made, without any loss of time in resetting the pressure at which the roll is to operate.

The lever B is connected with the lever E, which in turn is connected with the rod M. Upon the rod M is an upper spring plate $m'$ which is adjustable vertically and arranged to be adjusted. In the position of this plate $m'$, which is determined by the operative condition of the machine, this plate $m'$ serves as an abutment which rests upon the upper end of a spring G. This spring G on its part rests upon a lower plate $g'$ which is connected with the machine frame. This plate $g'$ is raised or lowered by the rotation of a hollow spindle N. The turning of the spindle N is brought about by a worm-gear and worm-drive K, the latter being operated by the hand wheel L. The bore of this spindle N provides room for the entrance of the rod M, which is guided in this bore. Upon the rod M is the indicator device F, the pointer of which is connected with the tie rod J, the lower end of which rests upon the lower plate $g'$.

By raising the lower plate $g'$, the spring G is pressed together, and the weight of the grinding roll is correspondingly decreased. The amount of such spring compression is determined by means of the rod J and indicator F, upon which indicator the remaining active weight of the roller is readily readable.

There is also provided a sleeve H which is provided with a handgrip on its upper portion, which sleeve is interiorly screw-threaded to engaeg exterior screw threads of the plate $m'$, and which allows between it and the lower plate $g'$, a small spacing during the operation with the grinding scale, so that the spring G can play. If sleeve H be screwed down to a tight seating with the lower plate $g'$ then the train of mechanism M, E, B are fixed to a definite lowermost position of the Hollander-roll. This corresponds to the usual grinding, whereby the spring does not play any more, the weight of the roller being moreover partially balanced or reduced to the amount of the before-regulated spring tension. The remaining, that is, active or working roller weight is indicated correctly also by this setting on the indicator F.

This mechanism has the special advantage that with its help the Hollander-roll can momentarily be lifted completely from the frame, by turning the hand wheel L and the worm-drive K, without causing a change in the setting of the spring in any manner. Without this improvement, at each complete unloading of the Hollander-roll weight, the spring G would have to be tensioned up to the entire raising of the weight of the roller, which not only would mean a greater loss in time, but also a new setting of the spring corresponding to the desired grinding pressure. But with the described improvement, it is possible to continue working with the former grinding pressure, after re-lowering of the roller to a certain depth, and during the entire procedure the tension of the spring remains the same, and, therefore, the setting of the same does not need any special attention.

Claims:

1. In a beating engine for paper pulp and the like having a frame and a beater roll, the combination of a balancing beam pivoted to the frame having the beater roll journaled thereon near one end thereof, a lever connected to the beam at the other end thereof, and a tension measuring device interposed between the lever and the frame whereby the pressure roll weight of said beater roll is regulated during the operation of beating paper pulp, by the tension acting upon the lever and balancing beam.

2. In a structure as defined in claim 1, the tension measuring device consisting of oppositely disposed upper and lower spring plates one of which is movable towards the other, the adjustment of which regulates the beating pressure of the beater roll.

3. In a structure as defined in claim 1, the tension measuring device consisting of oppositely disposed upper and lower spring plates one of which is movable towards the other, the adjustment of which regulates the beating pressure of the beater roll, and a sleeve for limiting the movement of the spring plates in respect to each other.

4. In a beating engine for paper pulp and the like having a frame and a beater roll, the combination of a balancing beam pivoted to the frame having the beater roll journaled thereon near one end thereof, a lever connected to the beam at the other end thereof, a tension measuring device having spring plates oppositely disposed on said measuring device, a worm driven member for moving one of said spring plates, a tie rod on one of said spring plates, and an indicator for said tie rod, whereby said balancing beam may be moved to raise or lower said beater roll.

In testimony whereof I affix my signature.

WILHELM THALER.